(12) United States Patent
Chen et al.

(10) Patent No.: US 6,268,599 B1
(45) Date of Patent: *Jul. 31, 2001

(54) OPTICAL SENSOR SWITCH SYSTEM FOR A SCANNER

(75) Inventors: Michael Chen; Jih-Yam Chen, both of Hsin-Chu; Jack Lin, E-Lan, all of (TW)

(73) Assignee: Avision Inc., Hsin-Chu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,805

(22) Filed: Dec. 11, 1998

(51) Int. Cl.[7] ........................................... H01J 3/14
(52) U.S. Cl. ..................... 250/208.6; 250/234; 250/229; 358/474
(58) Field of Search .............................. 250/208.1, 208.4, 250/208.6, 234, 235, 236, 551, 216, 229; 358/474, 482, 483; 327/514, 515

(56) References Cited

U.S. PATENT DOCUMENTS 5,371,359 * 12/1994 Hagiuda et al. ..................... 250/229
5,942,746 * 8/1999 Tsai .................................. 250/208.1

* cited by examiner

Primary Examiner—John R. Lee
Assistant Examiner—Kevin Pyo
(74) Attorney, Agent, or Firm—H. C. Lin; Patent Agent (57) ABSTRACT

An optical sensor switch system is used to effect a selection function of a scanner. The depressed switch for a selected function changes the light intensity incident on the pixels of a light sensitive panel in two steps. This change in light intensity activates the operation of the particular function. The change in light intensity is effected by shuttering the light from a source to the pixels. The pixels of the panel are divided into different sections, each designated to a particular function for the scanner.

5 Claims, 11 Drawing Sheets

OPTICAL SENSOR SWITCH SYSTEM FOR A SCANNER

BACKGROUND OF THE INVENTION

This invention relates to a scanner, in particular to a function control key for the scanner.

In traditional design for a scanner, the control key is a mechanical switch, which triggers certain operation to start or produces a certain signal to trigger a pre-programmed function. To accomplish such a series of operations, a number of switching operations may be required for connection to a special motherboard with circuits for different functions. The multiple switches, the multiple wiring connections, and the extra mother board all increase the cost of the scanner.

Further more, electronic switches must carry current. Such current carrying switches may wear out in time.

SUMMARY OF THE INVENTION

An object of this invention is to use a single switch to perform a sequence of operations. Another object of this invention is to control optically a series of circuit functions. Still another object of this invention is to construct a switch which optically controls circuit functions without carrying any current.

These objects are achieved by using a push-button sequential switch in the path of a light.

When the push-button is depressed or moved to different positions, different degree of optical reflection or transmission occurs. The light reflections or transmissions in the two positions are used to irradiate the pixels of a light sensitive panel. The pixels are divided into different sections, each designated to a particular function of the scanner. The difference in reflection or transmission is used to activate the selected function.

DETAILED DESCRIPTION OF THE PREFERRED EMBODIMENTS

Figure 1A:
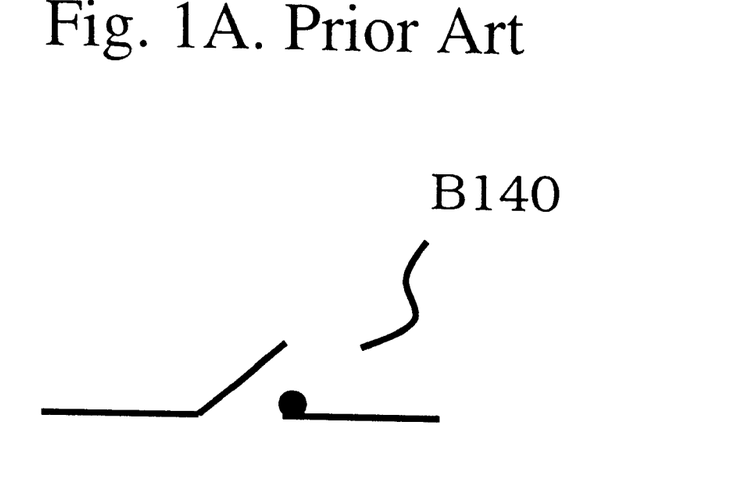
FIG. 1A shows a prior art mechanical switch when it opened.
Figure 1B:
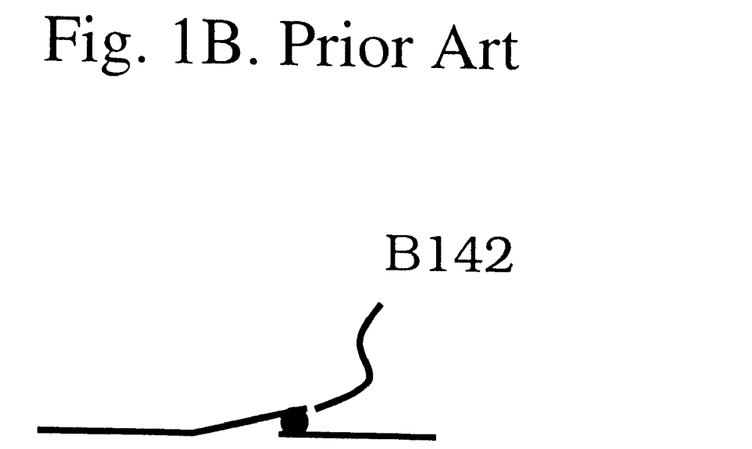
FIG. 1B shows a prior art mechanical switch when it is closed.

FIG. 1A shows a traditional mechanical switch B 140 in opened condition to break a circuit and FIG. 1B shows switch B142 in closed condition.

Figure 2A:
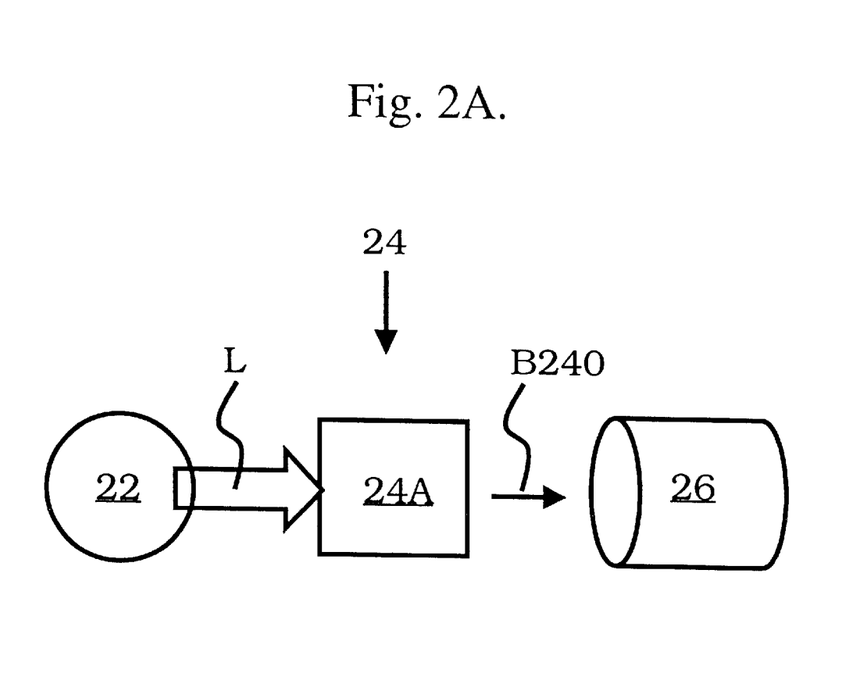
FIG. 2A shows a transmitted light-actuated push-button switch in disabled condition.
Figure 2B:
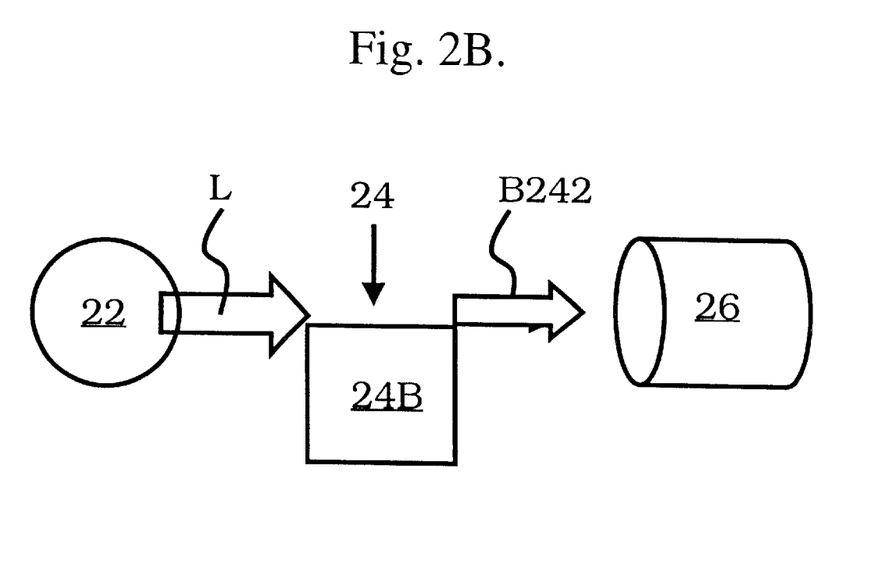
FIG. 2B shows a light-actuated push-button switch in enabled condition.

FIG. 2A shows a first embodiment of the present invention. A light beam L is generated from a light source 22, beaming toward an image sensor 26. A shutter can move in and out of the path between the light source 22 and the image sensor 26 by not exerting any force 24 against the shutter 24A. FIG. 2A shows the position of the shutter 24A when the shutter blocks the light beam L from irradiating the image sensor 26. Only the background light B240 can irradiate the image sensor. FIG. 2B shows the shutter in position 24B by exerting a force 24 in the direction of the arrow to allow the light beam L to irradiate the image sensor 26.

Figure 3A:
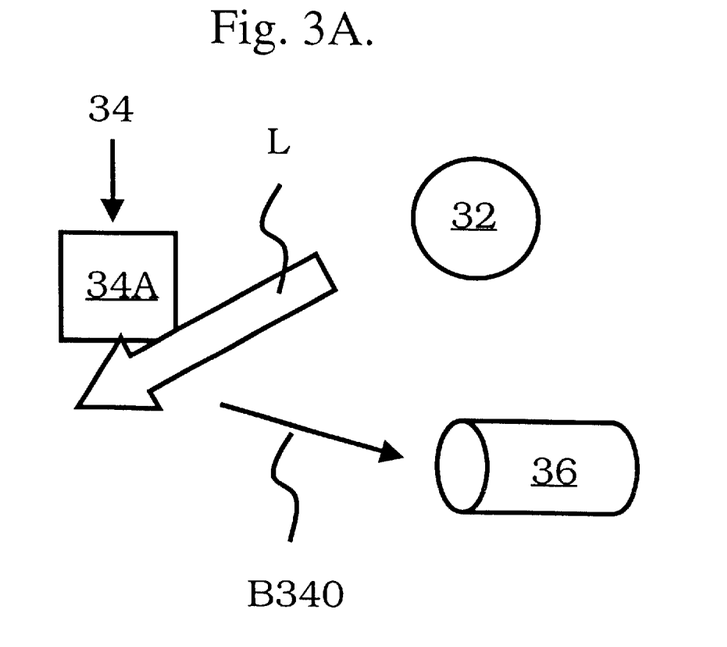
FIG. 3A shows a reflected light actuated push-button switch in disabled condition.
Figure 3B:
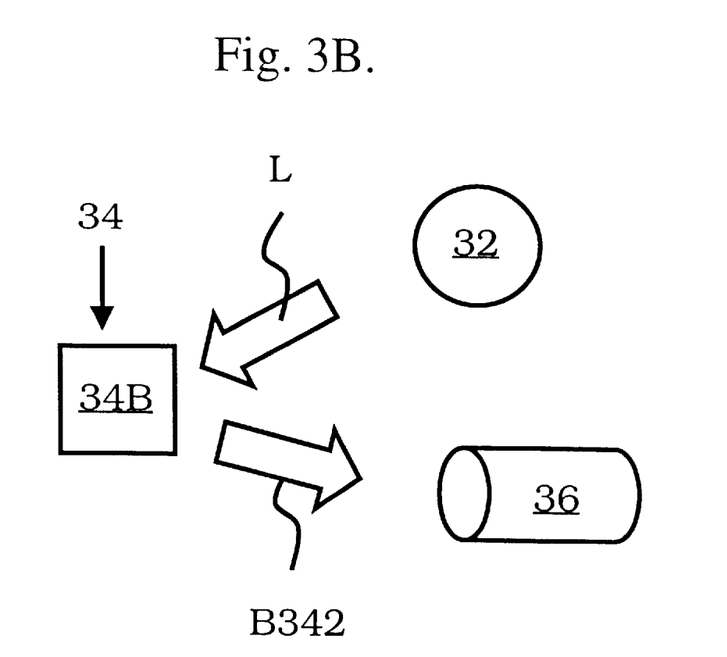
FIG. 3B shows a reflected light-actuated push-button switch in enabled condition.

FIG. 3A shows another embodiment of the present invention. The light beam L from a light source 22 can be reflected by a reflector. In FIG. 3A the reflector is placed in position 34A by not exerting any force 34 on the reflector and is out of the way for reflecting of the incident light L toward the image sensor 36. Only the background light B340 can irradiate the sensor 36. In FIG. 313, the reflector is placed in position 34B by exerting a force 34 against the reflector and reflects incident light beam L as reflected light B342 to irradiate the sensor 36.

Figure 4A:
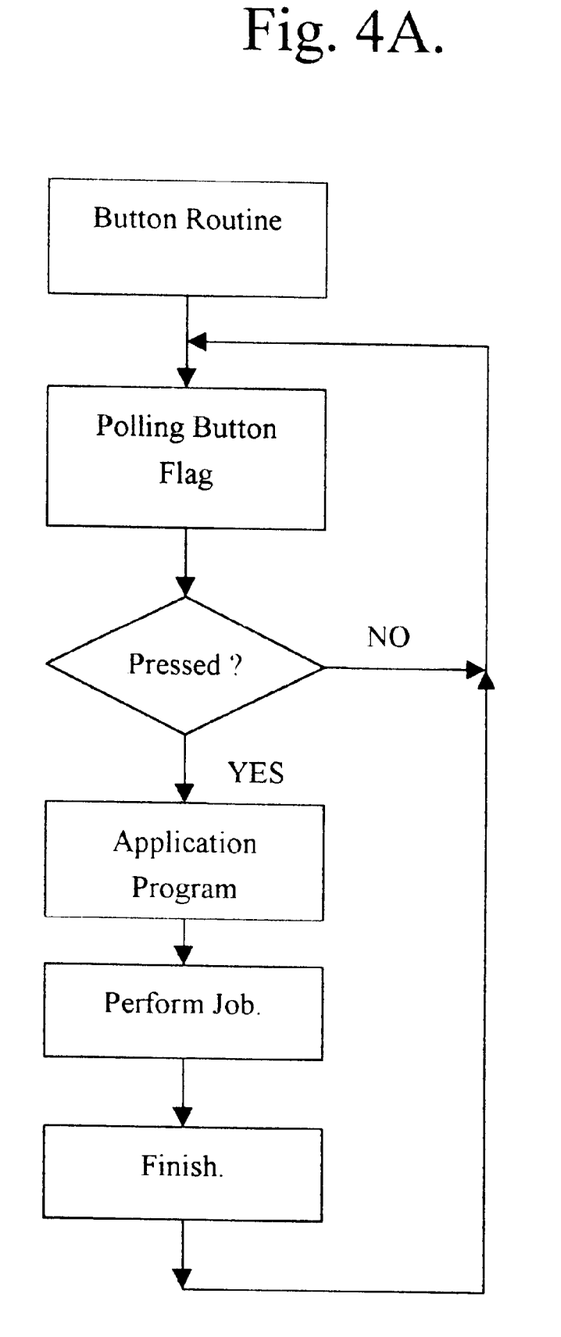
FIG. 4A shows a flow chart for a light-actuated push-button switch system.

FIG. 4A shows the flow chart for a particular push-button to perform a particular pre-programmed job. When a particular application is desired such as scan, copy, e-mail, fax, etc., the corresponding push-button is depressed until the job is performed.

Figure 4B:
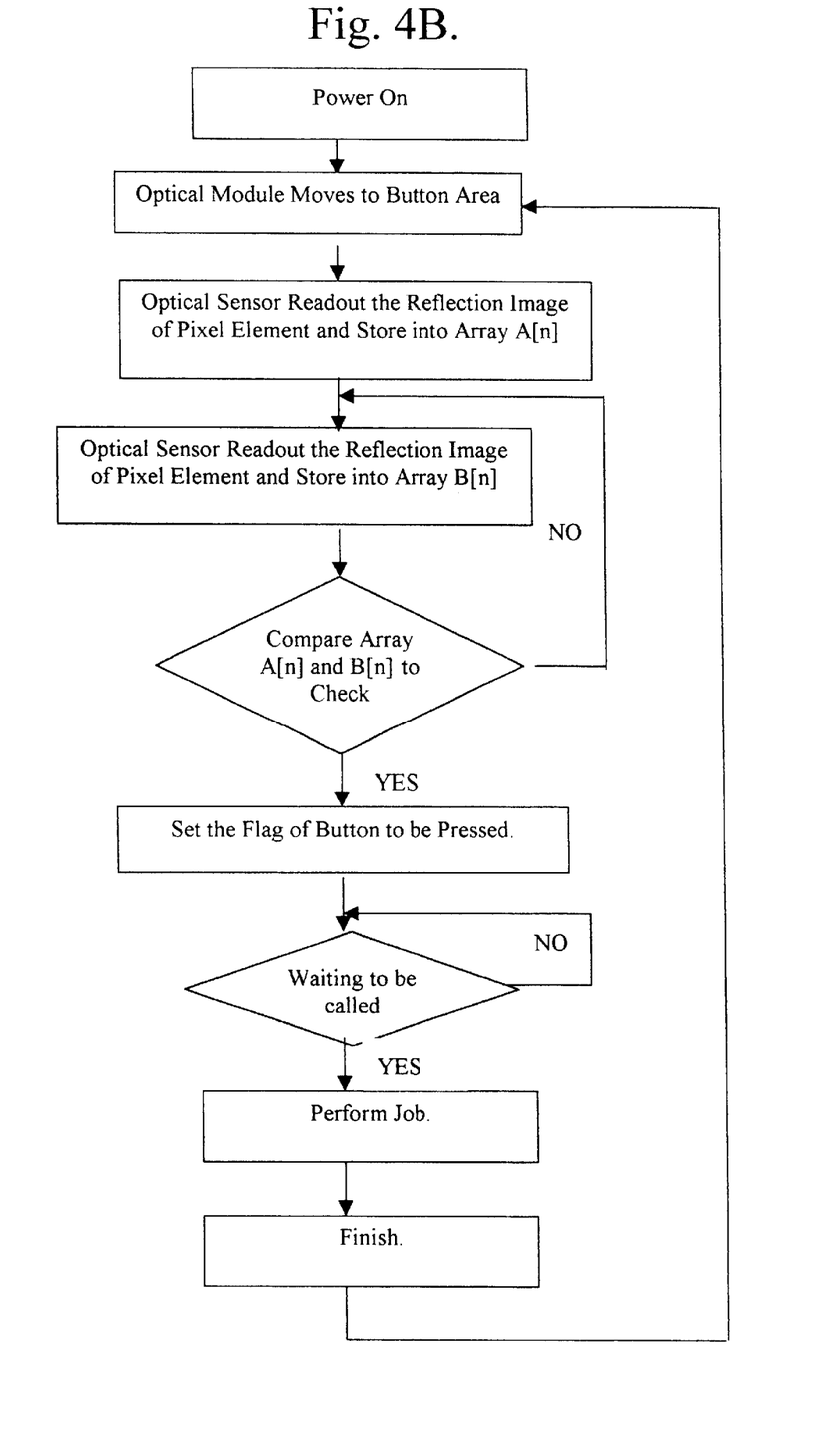
FIG. 4B shows a flow chart for a light-actuated push-button switch to enable and disable a particular scanner function.

FIG. 4B shows a flow chart showing how the selection can be accomplished. The image sensor has a matrix of pixels. The pixels are sub-divided into several areas, each corresponding to a particular function, such as e-mail, fax etc. When the machine is turned on, all the areas are sequentially sensitized. In each area corresponding to a particular function, two identical lines are sequentially irradiated, designated as A(n) and B(n) for the two successive scans. The first pass is performed with the full intensity of the transmitted or reflected light, and the scanned data are stored in a memory as A(n). The second pass is performed with reduced light if the two way switch is depressed and the data are stored in the memory as B(n). If the two sets of data A(n) and B(n) are different, the particular function corresponding to that particular switch is activated and the steps shown in FIG. 4A follows.

Figure 4C:
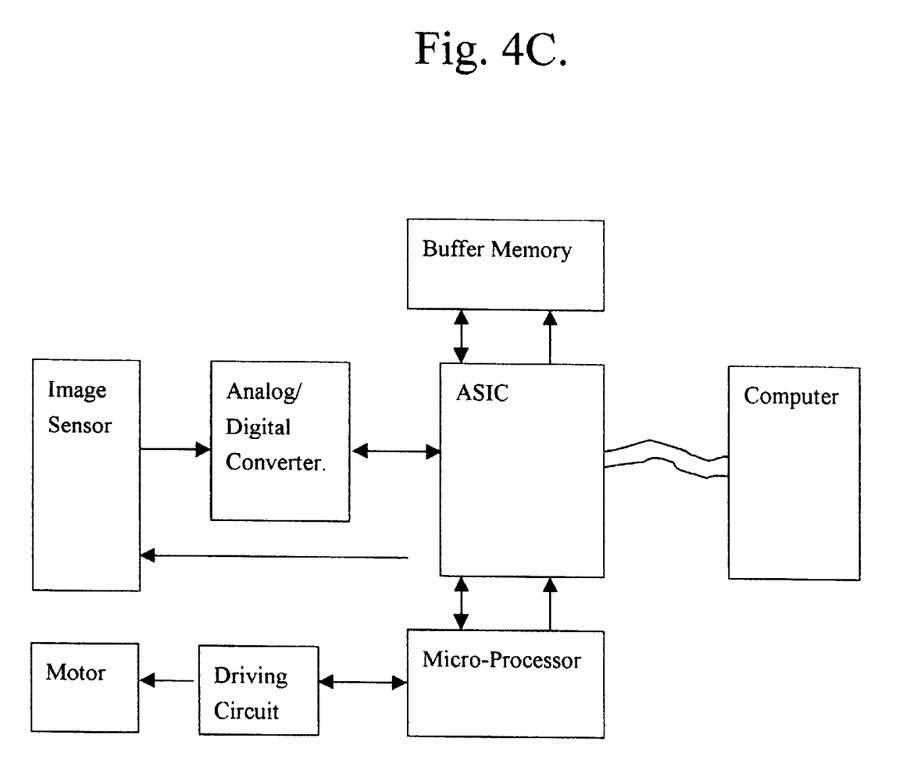
FIG. 4C shows a block diagram of a light-actuated push-button switch system.

FIG. 4C shows the blocks for implementing the functions of FIG. 4B. The scanned optical analog signal sensed by the sensor 11 is converted into digital data by the analog-to-digital converter 12. The converted digital data A(n) with B(n) data are sequentially stored in the buffer memory 14 through the ASIC (application specific integrated circuit) 13. The ASIC 13 is also connected to a computer 15 to display the functions being processed. The ASIC 13 also determines the particular function being selected by comparing A(n) and B(n). The selected function is then processed by the Micro-Processor 16 to control the Drive Circuit 17, which drives the scan motor 18. The micro-processor also communicates with the host computer, waiting to be polled by the host computer for launching the application software. The driving circuit 17 is used to drive the optical unit to the button area or scan area.

Figure 5A:
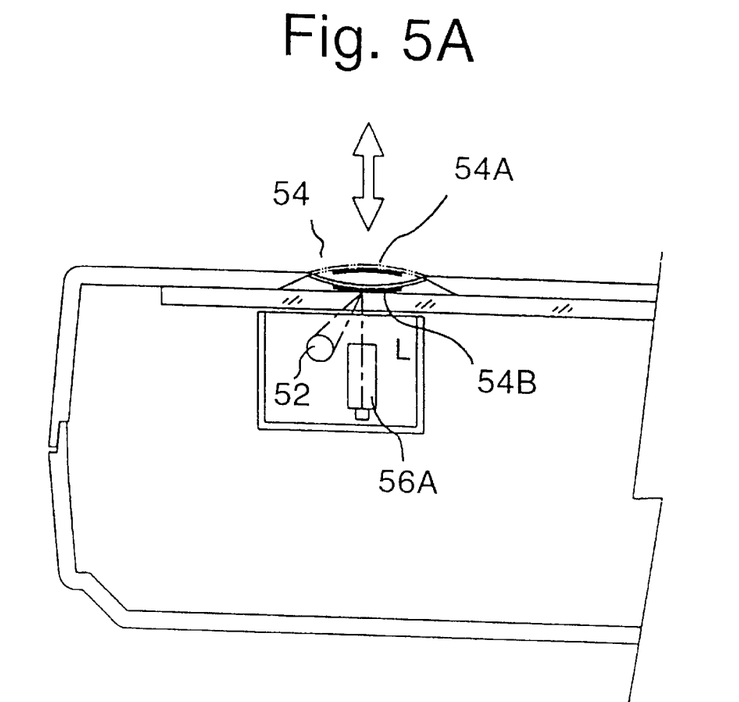
FIG. 5A shows the construction of a light actuated push-button switch mounted on a scanner.

FIG. 5A shows an optical system of a scanner incorporating an arc-shaped push-button light-actuated switch 54. When the light switch changes from position 54A to position 54B, the light beam L produced by the light source 52 changes the amount of reflections and hence radiance on the contact image sensor 56A. The different amount of radiance produces a difference signal for controlling a particular designated function as explained in the description of FIG. 4B.

Figure 5B:
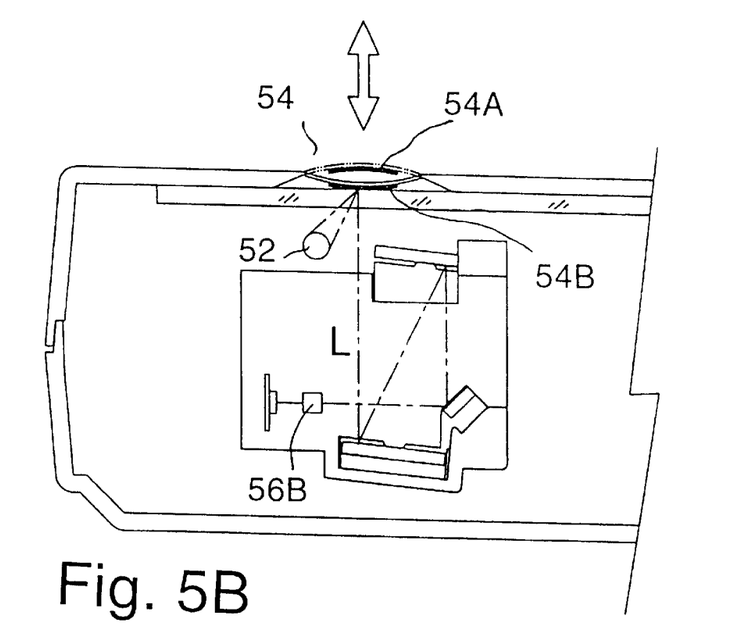
FIG. 5B shows the light-actuated push-button switch functions in the optical system.

In FIG. 5B, the reflected light L from the bottom position 54B of the push-button switch undergoes several reflections before reaching contact image sensor 56B. When the push-button is in position 54A, the reflected light from the push-button does not reach the charge coupled device (CCD) 56B.

Figure 6A:
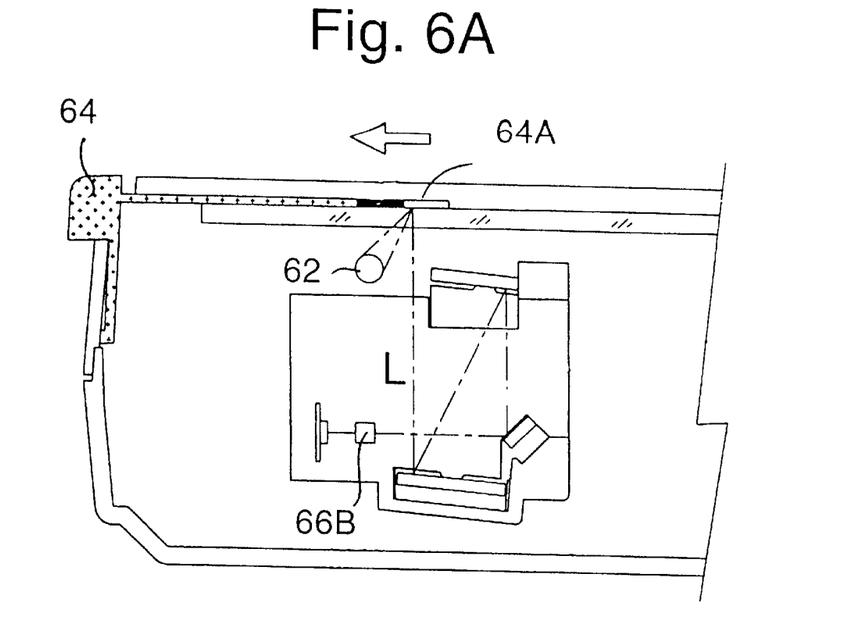
FIG. 6A shows a second embodiment of the light-actuated switch mounted on a scanner.

FIG. 6A shows another type of switch, a push rod type. The end of the push-rod has different reflective surfaces. When the push-rod 64 is in position 64A shown in FIG. 6A, the end of the push-rod is more reflective and a stronger light beam L is reflected from the push-rod to irradiate the CCD 66B. When the push-rod 64 is in position 64B as shown in FIG. 6B, the end of the push-rod is less reflective and a weaker light beam L is reflected from the push-rod to irradiate the image sensor or CCD 66B.

Figure 7A:
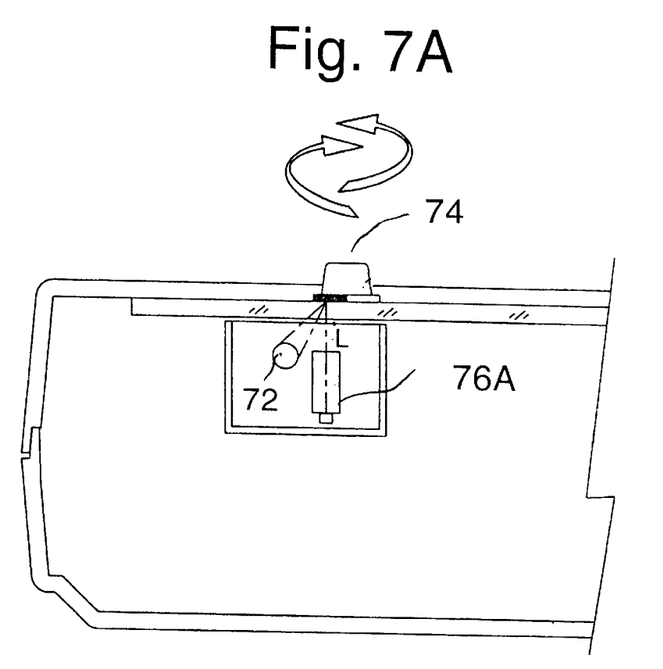
FIG. 7A shows a third embodiment of the light-actuated switch mounted on a scanner.
Figure 7B:
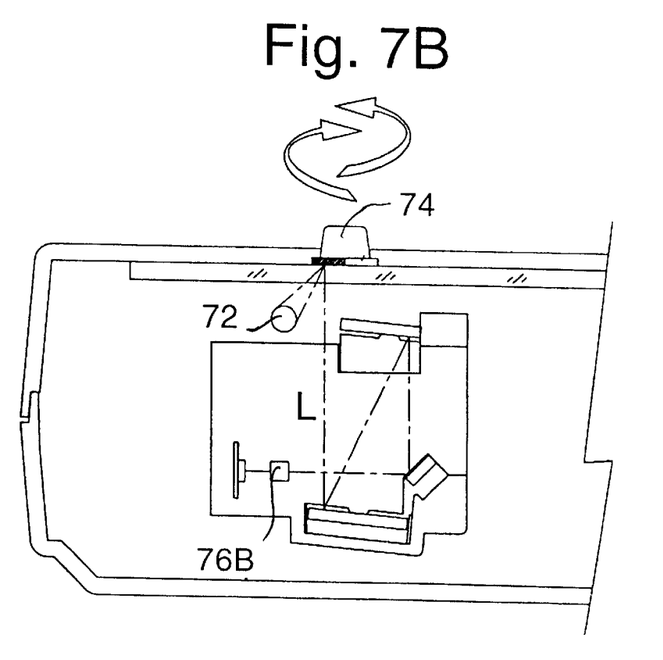
FIG. 7B shows how the light-actuated switch functions in the optical system.

FIG. 7A shows a third type of switch, a twist knob type. The bottom of the twist knob 74 is divided into a reflective half and an opaque half. When the light source 72 is incident on the opaque area, the reflected light L irradiating on the contact image sensor 76A is weaker than that reflected from the more reflective half of the twist knob. The same situation exists for an optical system using a CCC image sensor 76B as shown in FIG. 7B.

Figure 6B:
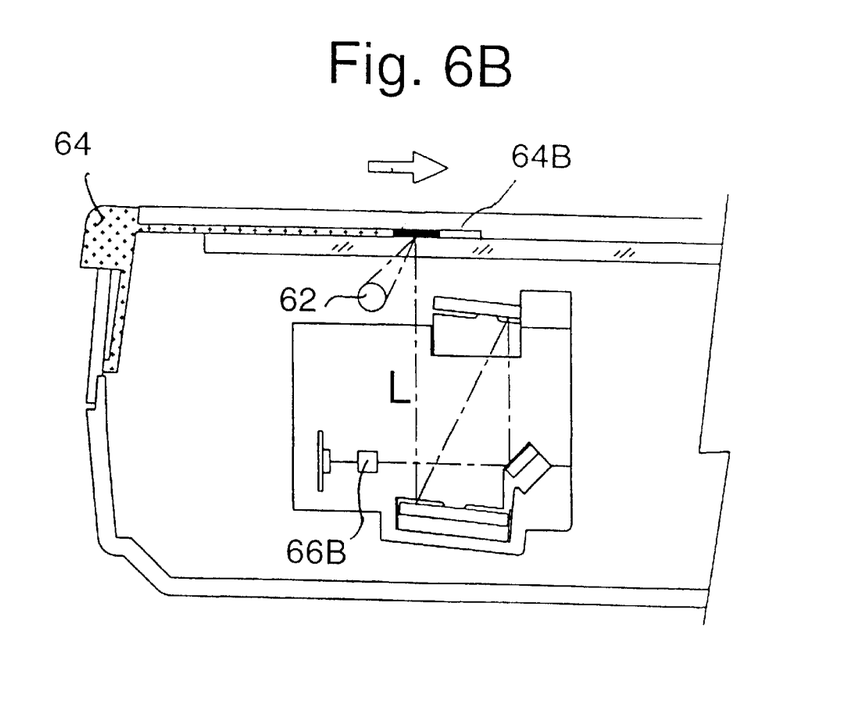
FIG. 6B shows how the light-actuated switch functions in the optical system.
Figure 8A:
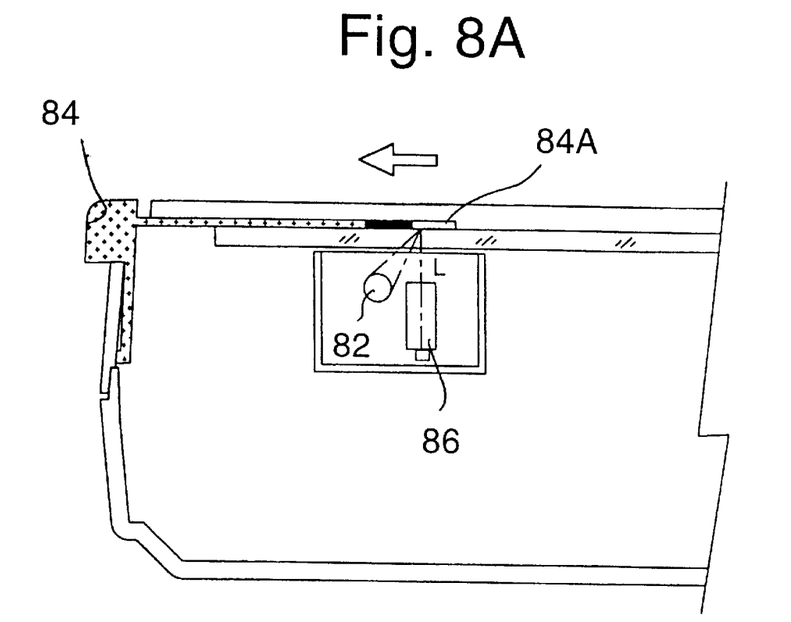
FIG. 8A shows a fourth embodiment of the light-actuated switch mounted on a scanner.
Figure 8B:
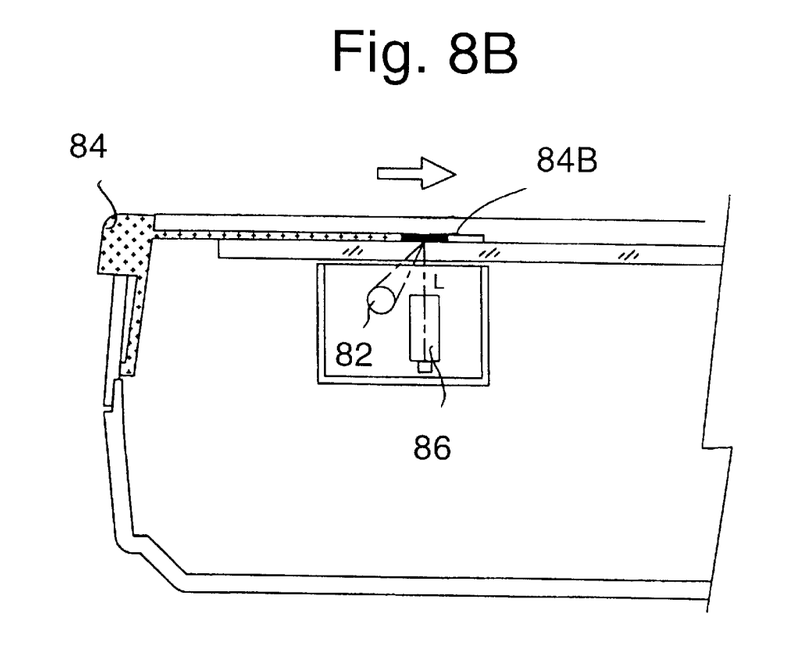
FIG. 8B shows how the light-actuated switch functions in the optical system.

FIG. 8A and FIG. 8B are similar to FIG. 6A and FIG. 6B respectively, except that contact image sensor 86 is used in FIG. 8A and FIG. 8B.

Figure 9:
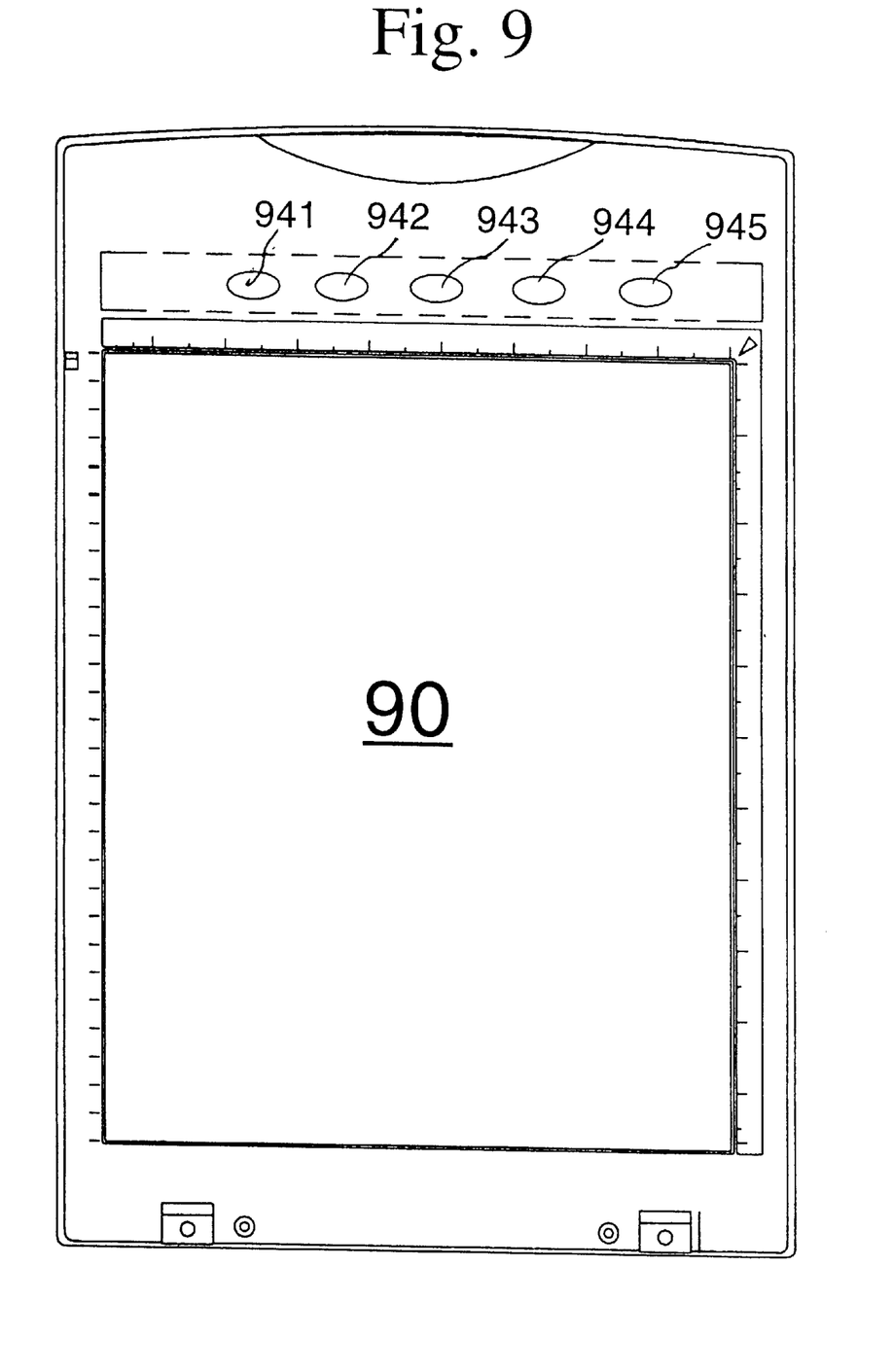
FIG. 9 shows the placement of the light-actuated switches on the control panel of a scanner.

FIG. 9 shows panel design of a scanner 90. Push-buttons switches 941, 942, 943 , 944 and 945 are mounted on the panel. These buttons control the standard functions customarily installed on a scanner such as copy, e-mail, scan, and the like. After any button is pushed, the operation described in connection with FIG. 4A and FIG. 4B is initiated.

While the preferred embodiments of the invention have been shown and described, it will be apparent to those skilled in the art that various modifications may be made in the embodiments without departing from the spirit of the present invention. Such modifications are all within the scope of this invention.

What is claimed is:

1. A selection system for different functions of a scanner, comprising:

a light sensitive panel with a matrix of pixels, said panel being divided into a plurality of areas;

a light source for scanning said panel;

an optical sensor selection switch having a first position to let said light source irradiate one of said plurality of areas of said panel in full intensity, and having a second position to let said light source to irradiate said one area of said plurality of areas at less than the full intensity; and means for comparing signals derived in said first position and signals derived in said second position to derive a difference signal to activate a selected function of said different functions.

2. A selection system as described in claim 1, wherein said fill intensity is derived from light transmission and said less than full intensity is derived by shuttering said full intensity.

3. A selection system as described in claim 2, wherein said full intensity is derived by reflection of the light from said light source, and said less than full intensity is derived by shuttering said reflected light.

4. A selection system as described in claim 3, wherein signals sensed by said pixels are converted into digital signals and stored in a memory.

5. A selection system as described in claim 1, further comprising a computer to display the selected function.

* * * * *